United States Patent
Faber

(10) Patent No.: US 10,451,837 B2
(45) Date of Patent: Oct. 22, 2019

(54) INDUCTIVE POWER CONNECTION/DATA TRANSFER FOR ELECTRO-OPTIC MIRROR

(71) Applicant: Gentex Corporation, Zeeland, MI (US)

(72) Inventor: Nolan R. Faber, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 100 days.

(21) Appl. No.: 15/629,361

(22) Filed: Jun. 21, 2017

(65) Prior Publication Data

US 2017/0363840 A1    Dec. 21, 2017

Related U.S. Application Data

(60) Provisional application No. 62/352,818, filed on Jun. 21, 2016.

(51) Int. Cl.
*G02B 7/182* (2006.01)
*B60R 1/08* (2006.01)
*B60R 1/12* (2006.01)
*B60R 1/04* (2006.01)

(52) U.S. Cl.
CPC .............. *G02B 7/182* (2013.01); *B60R 1/04* (2013.01); *B60R 1/088* (2013.01); *B60R 1/12* (2013.01); *B60R 2001/1253* (2013.01)

(58) Field of Classification Search
None
See application file for complete search history.

(56) References Cited

U.S. PATENT DOCUMENTS

| | | | |
|---|---|---|---|
| 6,547,133 B1 | 4/2003 | DeVries, Jr. et al. | |
| 2001/0013825 A1* | 8/2001 | DeLine | B60K 35/00 340/425.5 |
| 2002/0003571 A1* | 1/2002 | Schofield | B60C 23/00 348/148 |
| 2010/0220019 A1* | 9/2010 | Boote | B32B 17/10036 343/713 |
| 2015/0095789 A1* | 4/2015 | Hyde | G05B 19/042 715/738 |
| 2016/0036917 A1* | 2/2016 | Koravadi | G01C 21/3415 701/2 |

FOREIGN PATENT DOCUMENTS

| | | |
|---|---|---|
| CN | 201506296 U | 6/2010 |
| RU | 138094 U1 | 2/2014 |
| WO | 2015131509 A1 | 9/2015 |

* cited by examiner

*Primary Examiner* — Jennifer D. Carruth
(74) *Attorney, Agent, or Firm* — Price Heneveld LLP; Bradley D. Johnson

(57) ABSTRACT

A rearview assembly for a vehicle includes a rearview device having at least one of a display module and a mirror. A mount operably couples the rearview device to an inside surface of a windscreen of the vehicle. An at least partially translucent connector is operably coupled with the vehicle and abuts a portion of the windscreen. The connector includes an induction pad removably coupled with the rearview device and is configured to supply power and data to the rearview device.

14 Claims, 2 Drawing Sheets

INDUCTIVE POWER CONNECTION/DATA TRANSFER FOR ELECTRO-OPTIC MIRROR

CROSS-REFERENCE TO RELATED APPLICATION

This application claims priority to and the benefit under 35 U.S.C. § 119(e) of U.S. Provisional Application No. 62/352,818, filed on Jun. 21, 2016, entitled "INDUCTIVE POWER CONNECTION/DATA TRANSFER FOR ELECTRO-OPTIC MIRROR," the disclosure of which is hereby incorporated herein by reference in its entirety.

BACKGROUND OF THE DISCLOSURE

The present disclosure generally relates to a rearview assembly, and more particularly to a rearview assembly having an inductive power connection/data transfer for an electro-optic mirror.

SUMMARY OF THE DISCLOSURE

One aspect of the disclosure includes a rearview assembly for a vehicle. A rearview device includes at least one of a display module and a mirror. A mount operably couples the rearview device to a windscreen of the vehicle. An at least partially translucent connector is operably coupled with the vehicle and abuts a portion of the windscreen. The at least partially translucent connector includes a connector induction pad removably coupled with the rearview device and is configured to supply power and data to the rearview device.

Another aspect of the disclosure includes a rearview assembly having at least one of a display module and a mirror. A mount operably couples the rearview device to a windscreen of a vehicle. A thin ribbon connector is operably coupled with the vehicle and abuts a portion of the windscreen. The thin ribbon connector includes a connector induction pad removably coupled with the rearview device and is configured to supply at least one of power and data thereto.

Still another aspect of the disclosure includes a rearview assembly having at least one of a display module and a mirror. A mount operably couples the rearview device to a windscreen of a vehicle. A power and data connector is operably coupled with the vehicle and includes a connector induction pad removably coupled with the rearview device.

Yet another aspect of the present disclosure includes a rearview assembly that receives power and data from a vehicle through an inductive coupling. The rearview assembly may be positioned inside or outside the vehicle. The inductive coupling may be direct or through a substrate, such as a windscreen.

These and other features, advantages, and objects of the present disclosure will be further understood and appreciated by those skilled in the art by reference to the following specification, claims, and appended drawings.

DETAILED DESCRIPTION OF EMBODIMENTS

Figure 1:
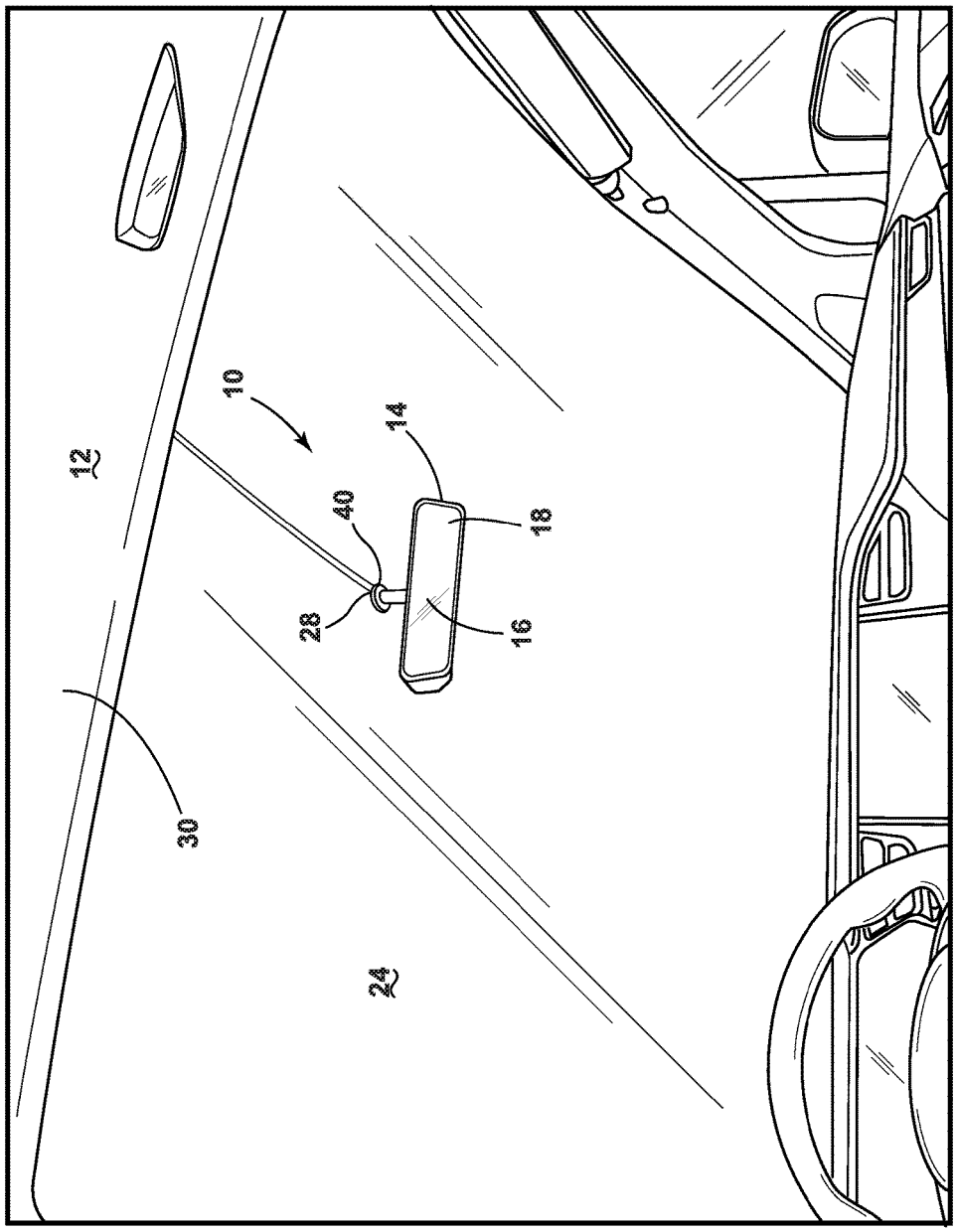
FIG. 1 is a front perspective view of one embodiment of a vehicle having a rearview assembly according to the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 2:
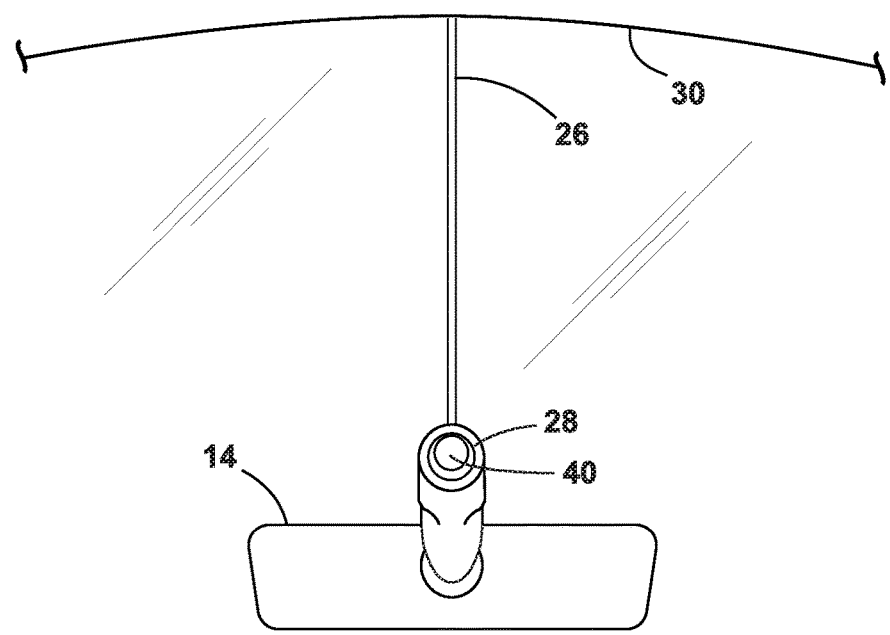
FIG. 2 is an enlarged front elevational view of the rearview assembly of FIG. 1.
Figure 3:
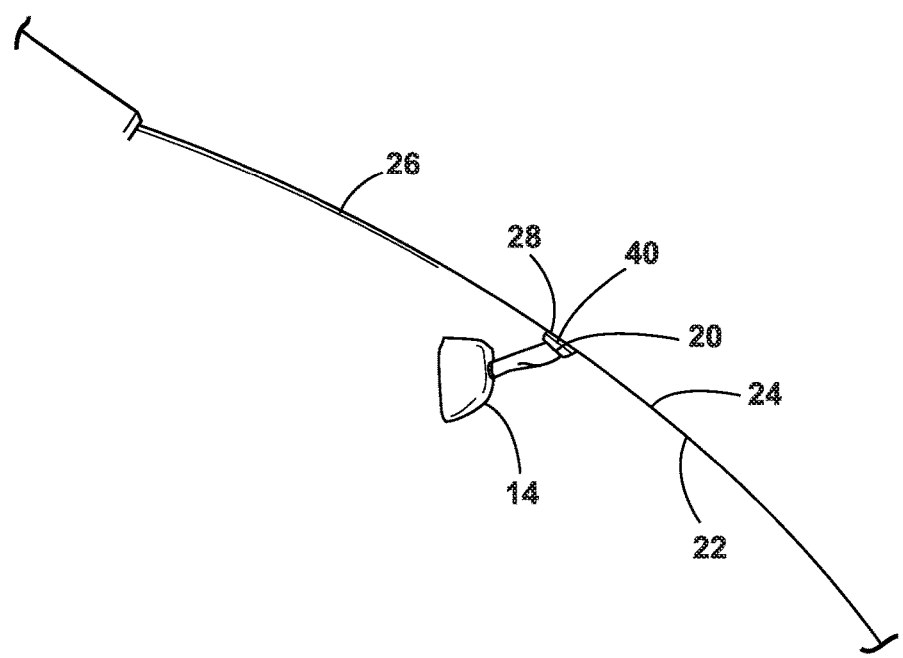
FIG. 3 is an enlarged side elevational view of the rearview assembly of FIG. 1.

Referring to FIGS. 1-3, reference numeral 10 generally designates a rearview assembly for a vehicle 12. A rearview device 14 includes at least one of a display module 16 and a mirror 18. A mount 20 operably couples the rearview device 14 to an inside surface 22 of a windscreen 24 of the vehicle 12. An at least partially translucent connector 26 is operably coupled with the vehicle 12 and abuts a portion of the windscreen 24. The connector 26 includes an induction pad 28 removably coupled with the rearview device 14 and is configured to supply power and data to the rearview device 14.

With reference again to FIGS. 1-3, in the illustrated embodiments, the rearview assembly 10 is supported on a fourth surface or the inside surface 22 of the windscreen 24. It is generally contemplated that the connector 26 may be configured to provide either data or power or both data and power for use with electro-optic features of the rearview assembly 10, as well as headlight dimming features, display module features, or other camera systems that can be used in conjunction with the rearview assembly 10. The rearview assembly 10 may include an electro-optic assembly having an electrochromic construction. The electro-optic assembly may include a full reflectance mode (day) and a partial reflectance mode(s) (night) for glare-protection purposes from light emanating from the headlights of the vehicles 12 approaching from the rear. The rearview assembly 10 includes front and rear substrates that have an electro-optic medium disposed therebetween. In most cases, when the electro-optic medium, which functions as the media of variable transmittance in the mirrors 18, is electrically energized, the electro-optic medium darkens and begins to absorb light, and the more light the electro-optic medium absorbs, the darker or lower in reflectance the mirror 18 becomes. When the electrical voltage is decreased to zero, the mirror 18 returns to its clear high reflectance state. When operated automatically, the mirror 18 generally incorporates light-sensing electronic circuitry, which is effective to change the mirror 18 to the dimmed reflectance modes when glare is detected, the sandwiched electro-optic medium being activated and the mirror being dimmed in proportion to the amount of glare that is detected. As glare subsides, the mirror 18 automatically returns to its normal high reflectance state without any action being required on the part of the driver of the vehicle 12. The display module 16 may be operable between activation and deactivation and configured to provide a view behind the vehicle 12 similar to that of the mirror 18. The connector 26 is generally configured to be a thin ribbon cable that may be printed on a wire or fiber-optic substrate. It is generally contemplated that the connector 26 will be disposed on the inside surface 22 of the windscreen 24. However, for safety glass configurations, including interior and exterior glass substrates with a plastic layer disposed therebetween, it is also contemplated that the thin ribbon cable may be disposed between the interior and exterior glass substrates of the windscreen 24. In this instance, the induction pad 28 may be disposed in the windscreen 24.

With reference to FIGS. 2 and 3, the power and/or data may be transferred via a wireless connection, such as an inductive coupling, through the interior substrate from the induction pad 28 of the connector 26 to a complementary induction pad 40 of the rearview device 14. The induction pad 28 and the complementary induction pad 40 may be engaged via a magnetic coupling, adhesive, mechanical fasteners, etc. Moreover, it is generally contemplated that the induction pad 28 and the complementary induction pad 40 may interface directly or through a portion of the windscreen 24. Alternatively, the induction pad 28 and the complementary induction pad 40 may be in abutting contact proximate the inside surface 22 of the windscreen 24. The induction pad 28 of the connector 26 may take on a variety of forms, such as an induction coil, an induction mat, etc. The complementary induction pad 40 of the rearview device 14 may also take on a variety of constructions that provide for communication of data and/or power between the complementary induction pad 40 and the induction pad 28. In addition, it is contemplated that the connector 26, as well as the induction pad 28 and the complementary induction pad 40, may take on a partially or substantially translucent or transparent configuration, such that light passes through at least a portion of the connector 26 and/or the induction pad 28 and the complementary induction pad 40. It will be understood that the connector 26 may also include an opaque or semi-translucent construction. The connector 26 extends up into a headliner 30 where the connector 26 ultimately connects with a can bus of the vehicle 12. It will also be understood that the induction pad 28 and the complementary induction pad 40 may interface at a dash or the headliner 30 of the vehicle instead of at the windscreen 24.

Traditional bulky wire harnesses are often aesthetically displeasing. A thinner ribbon cable/flex circuit in the form of the connector 26 that can be adhered to the inside surface 22 of the windscreen 24 may be an aesthetically pleasing solution. Alternatively, the connector 26 may pass between interior and exterior substrates of the windscreen 24. Further, use of the induction pad 28 on both the connector 26 and the rearview device 14 provides for data and or power transfer from the can bus of the vehicle 12 to the rearview device 14 and from the rearview device 14 to the can bus of the vehicle 12. During assembly, it is generally contemplated that the complementary induction pad 40 on the rearview device 14 would be operably coupled with the induction pad 28 on the mount 20 when the mount 20 is coupled with the windscreen 24. This construction would reduce the step of making a wire harness connection during assembly of the vehicle 12. In addition, the bulk of the wire harness extending down from the headliner 30 would be eliminated as would any wire cover configured to cover the wire harness, which can be large and potentially visually obstructing or distracting.

The present disclosure may be used with assemblies such as those described in U.S. Pat. Nos. 9,174,577; 8,925,891; 8,814,373; 8,201,800; and 8,210,695; U.S. Patent Application Publication No. 2012/0327234, now U.S. Pat. No. 9,838,653; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,885,240; 8,814,373; 8,646,924; 8,643,931; and 8,264,761; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety. It will be understood that the features as set forth herein may be used in rearview devices with a mirror, rearview devices with a display module, or rearview devices with both a mirror and a display module.

It will be appreciated that embodiments of the disclosure described herein may be comprised of one or more conventional processors and unique stored program instructions that control one or more processors to implement, in conjunction with certain non-processor circuits, some, most, or all of the functions of a rearview assembly, as described herein. The non-processor circuits may include, but are not limited to signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its form, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who rearview this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A rearview assembly for a vehicle comprising:
   a rearview device including at least one of a display module and a mirror;
   a mount operably coupling the rearview device to a windscreen of said vehicle;
   an at least partially translucent connector operably coupled with the vehicle and abutting a portion of the windscreen, the at least partially translucent connector including a connector induction pad removably coupled with the rearview device and configured to supply power and data to the rearview device; and
   a complementary induction pad configured to engage the connector induction pad, wherein the connector induction pad and the complementary induction pad are magnetically coupled.

2. The rearview assembly of claim 1, wherein the at least partially translucent connector extends from the rearview device to a headliner of said vehicle.

3. The rearview assembly of claim 1, wherein the complementary induction pad is at least partially translucent.

4. The rearview assembly of claim 1, wherein the windscreen includes interior and exterior glass substrates, and wherein the at least partially translucent connector extends between the interior and exterior glass substrates.

5. A rearview assembly comprising:
   a rearview device including a display module configured to display a view outside a vehicle;
   a mount operably coupling the rearview device to a windscreen of the vehicle; and
   a thin ribbon connector operably coupled with the vehicle and abutting a portion of the windscreen, the thin ribbon connector including a connector induction pad removably coupled with the rearview device and configured to supply at least one of power and data thereto, wherein a complementary induction pad is configured to engage the connector induction pad, and wherein at least one of the connector induction pad and the complementary induction pad is at least partially translucent.

6. The rearview assembly of claim 5, wherein the thin ribbon connector extends from the rearview device to a headliner of said vehicle.

7. The rearview assembly of claim 5, wherein the connector induction pad and the complementary induction pad are magnetically coupled.

8. The rearview assembly of claim 5, wherein the connector induction pad and the complementary induction pad each include an interface region having a generally circular profile.

9. The rearview assembly of claim 5, wherein the windscreen includes interior and exterior glass substrates, and wherein the thin ribbon connector extends between the interior and exterior glass substrates.

10. A rearview assembly comprising:
    a rearview device including at least one of a display module and a mirror;
    a mount operably coupling the rearview device to a windscreen of a vehicle; and
    a power and data connector operably coupled with the vehicle and including a thin ribbon cable and a connector induction pad removably coupled with the rearview device, wherein the thin ribbon cable includes one of a wire and fiber-optic substrate configured to relay data to the rearview device.

11. The rearview assembly of claim 10, wherein the rearview device includes a complementary induction pad configured to engage the connector induction pad.

12. The rearview assembly of claim 11, wherein at least one of the connector induction pad and the complementary induction pad is at least partially translucent.

13. The rearview assembly of claim 10, wherein the windscreen includes interior and exterior glass substrates, and wherein the power and data connector extends between the interior and exterior glass substrates.

14. The rearview assembly of claim 10, wherein the power and data connector is configured to provide power and data to the rearview device in relation to at least one of headlight dimming functionality, display module functionality, and imager system functionality.

\* \* \* \* \*